United States Patent
Yi et al.

(10) Patent No.: US 10,728,562 B2
(45) Date of Patent: Jul. 28, 2020

(54) VIDEO TRANSMITTING DEVICE AND VIDEO PLAYING DEVICE

(71) Applicant: KT CORPORATION, Gyeonggi-do (KR)

(72) Inventors: Yong-Beom Yi, Seoul (KR); Zu-Cheul Lee, Gyeonggi-do (KR); Yeong-Hwan Jeong, Gyeonggi-do (KR); Sun-Young Cho, Seoul (KR); Won-Yong Kim, Gyeonggi-do (KR)

(73) Assignee: KT CORPORATION, Gyeonggi-do (KR)

( * ) Notice: Subject to any disclaimer, the term of this patent is extended or adjusted under 35 U.S.C. 154(b) by 0 days.

(21) Appl. No.: 15/857,592

(22) Filed: Dec. 28, 2017

(65) Prior Publication Data

US 2018/0255308 A1 Sep. 6, 2018

(30) Foreign Application Priority Data

Dec. 28, 2016 (KR) .......................... 10-2016-0181191

(51) Int. Cl.
*H04N 19/21* (2014.01)
*H04N 19/40* (2014.01)
(Continued)

(52) U.S. Cl.
CPC ............. *H04N 19/21* (2014.11); *H04N 19/40* (2014.11); *H04N 21/44012* (2013.01);
(Continued)

(58) Field of Classification Search
CPC .... H04N 19/597; H04N 19/61; H04N 21/435; H04N 19/46; H04N 21/4622;
(Continued)

(56) References Cited

U.S. PATENT DOCUMENTS

2005/0117789 A1 6/2005 Kim et al.
2006/0114363 A1* 6/2006 Kang ............... H04N 21/23412
348/838

(Continued)

FOREIGN PATENT DOCUMENTS

KR 10-0695133 B1 3/2007
KR 10-2016-0026005 A 3/2016
(Continued)

*Primary Examiner* — Farhan Mahmud
(74) *Attorney, Agent, or Firm* — IP Legal Services, LLC

(57) ABSTRACT

Provided is an apparatus may be provided for transmitting a moving image including an alpha channel. The apparatus may include an object region extractor configured to extract an object region from the moving image, a color frame generator configured to generate a color frame corresponding to the extracted object region, an alpha channel frame generator configured to generate an alpha channel frame corresponding to the object region based on the alpha channel included in the moving image, a synthesizer configured to generate a synthesized frame by synthesizing the color frame and the alpha channel frame; an encoder configured to encode the synthesized frame; and a transmitter configured to transmit the encoded synthesized frame to a reproducing device.

18 Claims, 11 Drawing Sheets

(51) Int. Cl.
*H04N 21/44* (2011.01)
*H04N 21/854* (2011.01)
*H04N 19/27* (2014.01)
*H04N 21/23* (2011.01)

(52) U.S. Cl.
CPC ........... *H04N 21/854* (2013.01); *H04N 19/27* (2014.11); *H04N 21/23* (2013.01)

(58) Field of Classification Search
CPC ........... H04N 21/44008; H04N 21/235; H04N 21/4312; H04N 21/812; H04N 21/816; H04N 19/40; H04N 21/4402; H04N 21/23418; H04N 21/4728; H04N 21/482; G06F 3/14; H04L 65/4084
See application file for complete search history.

(56) References Cited

U.S. PATENT DOCUMENTS

| | | | |
|---|---|---|---|
| 2010/0177975 | A1 | 7/2010 | Kim et al. |
| 2014/0215508 | A1* | 7/2014 | Wyatt ................ H04N 21/4758 725/24 |
| 2015/0188998 | A1 | 7/2015 | Yuan |

FOREIGN PATENT DOCUMENTS

| | | | |
|---|---|---|---|
| KR | 10-2016-0102419 A | | 8/2016 |
| KR | 10-1663085 B1 | | 10/2016 |

\* cited by examiner

Color frame

Alpha channel frame

```
Rendering data
{
        "version":"1",
        "frames":[
            {
    510 —— "time" : 0.333,
    520 —— "visible" : "true",
    530 —— "start_x" : 200,
    540 —— "start_y" : 300,
    550 —— "width" : 270,
    560 —— "heigth" : 360
            },{
                "time" : 0.333,
                "visible" : "false",
            }
        ]
}
```

```
Property
version : 1(constant)
time : Milliseconds from a beginning of contents
start_x : absolute coordinate x
start_y : absolute coordinate y
Width
Height
visible : whether a HVR image is activated or not (true, false)
```

Color frame

Alpha channel frame

VIDEO TRANSMITTING DEVICE AND VIDEO PLAYING DEVICE

CROSS REFERENCE TO PRIOR APPLICATIONS

The present application claims priority under 35 U.S.C. § 119 to Korean Patent Application No. 10-2016-0181191 (filed on Dec. 28, 2016).

BACKGROUND

The present disclosure relates to a multimedia service system and, more particularly, to providing multimedia data (e.g., video or moving images) supporting an alpha channel frame regardless of CODEC comparability.

An alpha channel is a specialized channel for covering or controlling a predetermined region of an image. In general, an image displayed on a screen is produced by three channels and reproduces an image by synthesizing three color lights, such as Red (R), Green (G), and Blue (B). The fourth channel may be referred to as an alpha channel. The alpha channel is configured of black and white and used as a channel synthesized with another image.

Lately, an augmented reality (AR) service has been introduced. Through the AR service, virtual reality (VR) advertisement is provided using an alpha channel. For such an AR service, it is required to use a video format supporting the alpha channel, such as WebM. A user device in home needs to support a corresponding CODEC in order to use the virtual advertisement using an alpha channel using VP8 or VP9 CODEC technology. However, typical user devices support only H.264 CODEC and do not support VP8 and VP9 CODEC. Accordingly, in order to use the AR service such as a VR advertisement, it is necessary to replace the typical user devices to a user device supporting H.264 CODEC.

SUMMARY

This summary is provided to introduce a selection of concepts in a simplified form that is further described below in the Detailed Description. This summary is not intended to identify key features or essential features of the claimed subject matter, nor is it intended to be used to limit the scope of the claimed subject matter.

Embodiments of the present disclosure overcome the above disadvantages and other disadvantages not described above. Also, embodiments of the present disclosure are not required to overcome the disadvantages described above, and embodiments of the present disclosure may not overcome any of the problems described above.

In accordance with one aspect of the present disclosure, an apparatus may be provided for supporting an alpha channel frame and processing a video data.

In accordance with another aspect of the present disclosure, an apparatus may be provided for transmitting a moving image including an alpha channel. The apparatus may include an object region extractor configured to extract an object region from the moving image, a color frame generator configured to generate a color frame corresponding to the extracted object region, an alpha channel frame generator configured to generate an alpha channel frame corresponding to the object region based on the alpha channel included in the moving image, a synthesizer configured to generate a synthesized frame by synthesizing the color frame and the alpha channel frame; an encoder configured to encode the synthesized frame; and a transmitter configured to transmit the encoded synthesized frame to a reproducing device.

The object region may be a rectangular region including at least one of target objects.

The color frame generator may be configured to generate the color frame to be smaller than about half of a one frame of the moving image, and the alpha channel frame generator is configured to generate the alpha channel frame to be smaller than about half of a one frame of the moving image.

The synthesizer may be configured to generate the synthesized frame to be smaller than one frame of the moving image.

The synthesizer may be configured to generate the synthesized frame to have the color frame and the alpha channel frame not to be overlapped and arranged in parallel.

The transmitter may be configured to further transmit a background image associated with the synthesized frame to the reproducing device, and the synthesized frame may be rendered to be overlapped on the background image.

The transmitter may be configured to further transmit rendering information to the reproducing device for rendering the synthesized frame on the background image.

The rendering information may include information on coordinates of the object region which indicates a position to be rendered on the background image for rendering the color frame and the alpha frame.

The rendering information may include information on a time of rendering the synthesized frame on the background image.

The apparatus may operate in an environment not supporting the alpha channel.

The apparatus may further include a pre-encoder configured to change colors of a surrounding region in the color frame to a predetermined single color, wherein the surrounding region is a region surrounding the object region in the color frame.

The pre-encoder may be configured to perform the changing color process before performing encoding the synthesized frame.

In accordance with another embodiment, an apparatus may be provided for reproducing a moving image including an alpha channel. The apparatus may include a receiver configured to receive a synthesized frame from a transmitting apparatus, a decoder configured to decode the synthesized frame, a frame divider configured to divide the decoded synthesized frame into a color frame and an alpha frame, and a rendering unit configured to render the color frame and the alpha frame, wherein the color frame and the alpha frame are generated corresponding to an object region extracted from the moving image.

The receiver may be configured to receive a background image associated with the synthesized image from the transmitting apparatus; and the rendering device may be configured to render the color frame and the alpha channel frame to be overlapped on the background image.

The receiver may be configured to receive rendering information, from the transmitting apparatus, for rendering the color frame and the alpha frame on the background image.

The rendering information may include coordinates of the object region to be rendered on the background image, and the rendering unit may be configured to render the color frame and the alpha channel frame on the background image using the coordinates.

The rendering information may include a time of rendering and the rendering unit is configured to perform the rendering based on the time.

Colors of a surrounding region in the color frame may be changed to a predetermined single color before performing encoding.

In accordance with still another embodiment, a method may be provided for processing a moving image including an alpha channel. The method may include extracting an object region from the moving image, generating a color frame corresponding to the extracted object region, generating an alpha channel frame corresponding to the extracted object region based on the alpha channel included in the moving image, and generating a synthesized frame by synthesizing the color frame and the alpha channel frame, wherein the synthesized frame includes the color frame and the alpha channel frame arranged in parallel and not to be overlapped to each other.

BRIEF DESCRIPTION OF THE DRAWINGS

The above and/or other aspects of some embodiments of the present invention will become apparent and more readily appreciated from the following description of embodiments, taken in conjunction with the accompanying drawings, of which:

FIG. 5 is a diagram for explaining rederning information;

DETAILED DESCRIPTION OF EMBODIMENTS

Figure 1:
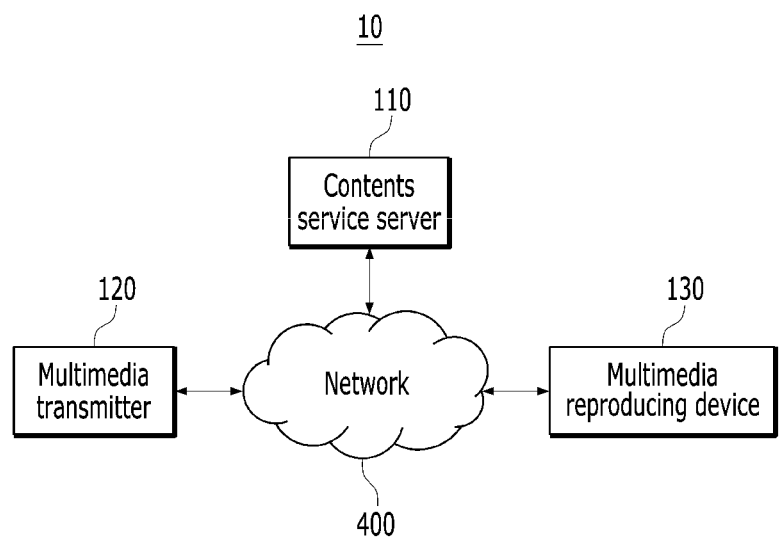
FIG. 1 illustrates a multimedia reproducing system in accordance with at least one embodiment.

Reference will now be made in detail to exemplary embodiments of the present disclosure, examples of which are illustrated in the accompanying drawings, wherein like reference numerals refer to like elements throughout. The embodiments are described below, in order to explain embodiments of the present disclosure by referring to the figures.

Hereinafer, a system for processing multimedia data that supports an alpha channel frame will be described. The multimedia data may include at least one of video data, image data, and moving image data. In accordance with at least one embodiment, a multimedia processing system supporting an alpha channel frame may include a multimedia transmitting device and a multimedia reproducing device. Such a multimedia processing system may enable a typical device incapable of processing an alpha channel related CODEC to reproduce moving images having an alpha channel frame. Furthermore, the multimedia processing system according to at least one embodiment may provide an augmented reality (AR) service employing an alpha channel frame and a real time virtual reality (VR) advertisement service without replacing a typical Internet protocol (IP) TV set top box. That is, the multimedia processing system may generate a synthesized frame (e.g., or a combined frame) by synthesizing (e.g., combining) a color frame and an alpha frame and applying the synthesized frame to various services. Moreover, the multimedia transmitting device and the multimedia reproducing device may be provided for preventing data traffic data from increasing due to adding alpha channel frames. Hereinafter, the multimedia processing system in accordance with at least one embodiment will be described with reference to FIG. 1.

FIG. 1 is a diagram illustrating a multimedia processing system in accordance with at least one embodiment. Referring to FIG. 1, multimedia processing system 10 may include contents service server 110, multimedia transmitting device 120, multimedia reproducing device 130, and communication network 400. However, embodiments of the present disclosure are not limited thereto. For convenience and ease of description, only essential constituent elements may be shown in FIG. 1. However, other constituent elements may be included in the multimedia processing system.

Referring to FIG. 1, contents service server 110, multimedia transmitting device 120, and multimedia reproducing device 130 may be connected through communication network 400 in accordance with at least one embodiment. For example, multimedia reproducing device 130 may be connected to multimedia transmitting device 120 and contents service server 110 at the same time or with a predetermined time interval. Contents service server 110, multimedia transmitting device 120, and multimedia reproducing device 130 are geographically and physically separated. Each of contents service server 110, multimedia transmitting device 120, and multimedia reproducing device 130 may be an independent computing system. Contents service server 110, multimedia transmitting device 120, and multimedia reproducing device 130 may be connected to each other through communication network 400 and exchange data through communication network 400. In particular, contents service server 110 may be a system of a service provider that provides a contents service and installed at a predetermined location of the service provider. Multimedia reproducing device 130 may be installed at a predetermined location of a user or a mobile device carried by a user.

Communication network 400 may be a network that connects entities, such as devices and servers, and enables the entities to exchange data and information. For example, communication network 400 may include 3G, 4G, 5G, Wi-Fi, Bluetooth, Internet, LAN (Local Area Network), Wireless LAN (Wireless Local Area Network), WAN (Wide Area Network), PAN (Personal Area Network), but not limited thereto.

Contents service server 110 may be a computer server providing a contents service. The contents service denotes s service providing distinct types of multimedia data including images, moving images, and related supplement information. Multimedia data may include at least one of image data, moving image data, and video data. Contents service server 110 may be a computing system of a $3^{rd}$ party that provides a contents service. Furthermore, contents service server 100 may be a group of computing systems and provide requested contents to a device through communication network 400. In addition, contents service server 110 may provide contents services to subscribers who register at contents service server 110 for corresponding services. The contents may include multimedia data including images, moving images, videos, and audios. That is, contents service server 110 may be a computer processing system including at least one processor, at least one memory (e.g., connected to a database), and at least one of communication modules.

In accordance with at least one embodiment, contents service server 110 may transmit original moving images each having an alpha channel to multimedia transmitting device 120. Contents service server 110 may transmit a background image to multimedia transmitting device 120. Herein, the background image may be a broadcasting image, but embodiments of the present disclosure are not limited thereto.

Multimedia transmitting device 120 may be a computer system including at least one processor, at least one memory, and at least one communication module.

Figure 3A:
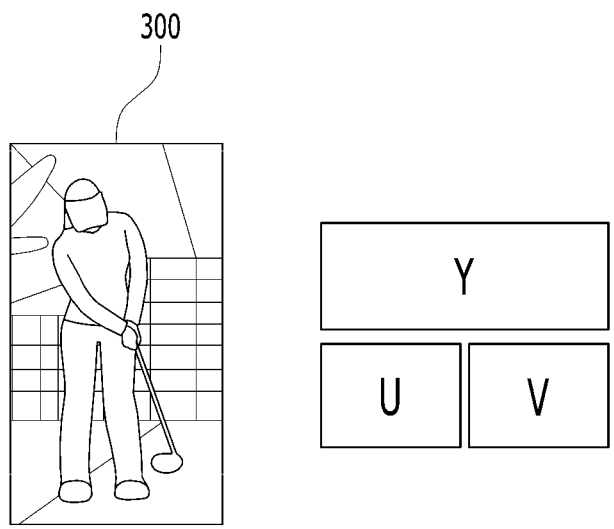
FIG. 3A to FIG. 3C are diagrams for explaining synthesizing moving images including an alpha channel in a multimedia transmitting device.

Multimedia transmitting device 120 may receive original moving images from contents service server 110, separate target objects and a background image from the original moving images, define a predetermined region including target objects, and extract digital data (e.g., region information) of the predetermined region. Referring to FIG. 3A, predetermined region 300 including target objects may be a rectangular shaped region (e.g., rectangular region) having target objects.

Referring back to FIG. 1, multimedia transmitting device 120 may generate color frames for the extracted target object regions. Multimedia transmitting device 120 may generate alpha channel frames from alpha channel included in the original moving images, corresponding to the extracted object region. Herein, multimedia transmitting device 120 may control a size of a color frame and a size of an alpha channel frame to be smaller than about half size of one frame of the original moving image.

Multimedia transmitting device 120 may change a color of a predetermined region that surrounds a target object in a color frame to be a single color. For example, multimedia transmitting device 120 may perform such a color changing operation before encoding a synthesizing frame.

Multimedia transmitting device 120 may generate a synthesized frame by synthesizing the color frame and the alpha channel frame and encode the synthesized frame. Herein, multimedia transmitting device 120 may control a size of the generated synthesized frame to be smaller than a size of one frame of the original frame. Furthermore, multimedia transmitting device 120 may generate the synthesized frame to have the color frame and the alpha frame not to be overlapped to each other and to be arranged in parallel.

Multimedia transmitting device 120 may transmit the encoded synthesized frame to multimedia reproducing device 130. Also, multimedia transmitting device 120 may transmit a background image associated with the synthesized frame to multimedia reproducing device 130. Multimedia reproducing device 130 may render the synthesized frame to be overlapped on the background image. Such a background image may be received from a $3^{rd}$ party device, different from multimedia transmitting device 120.

Multimedia transmitting device 120 may transmit rendering information to multimedia reproducing device 130 for rendering the synthesized frame on the background image. The rendering information may include information on a coordinate of an object region, which indicates a position of the object region to be rendered on the background image. Furthermore, the rendering information may include information on a time of rendering the object region on the background image.

Multimedia reproducing device 130 may receive a synthesized frame from multimedia transmitting device 120. Furthermore, multimedia reproducing device 130 may receive a background image associated with the synthesized frame from multimedia transmitting device 120. Multimedia reproducing device 130 may receive a background image from $3^{rd}$ party device, different from multimedia transmitting device 120.

Multimedia reproducing device 130 may receive rendering information from multimedia transmitting device 120. The rendering information may be information for rendering a color frame and an alpha frame on a background image. Such rendering information may include coordinate information and time information. The coordinate information indicates coordinates of object regions, which indicate positions of the object regions to be rendered on the background image. The time information indicates a time of rendering the object regions on the background image.

Multimedia reproducing device 130 may decode a synthesized frame and divide the decoded synthesized frame into a color frame and an alpha channel frame. Multimedia transmitting device 120 may generate the color frame and the alpha channel frame for the object region extracted from the original moving image.

After separation, multimedia reproducing device 130 may render the color frame and the alpha channel frame on the background image. Multimedia reproducing device 130 may perform the rendering operation to overlap the color frame and the alpha channel frame on the background image. For example, multimedia reproducing device 130 may render the color frame and the alpha channel frame on the background image based on the coordinate information and the time information included in the rendering information.

Multimedia reproducing device 130 may be a device operating in an environment not supporting an alpha channel. For example, multimedia reproducing device 130 may include an Internet Protocol Television (IPTV), a Set-top Box, a streaming adopter, a streaming dongle, a Smart TV, and a Connected TV.

Figure 2:
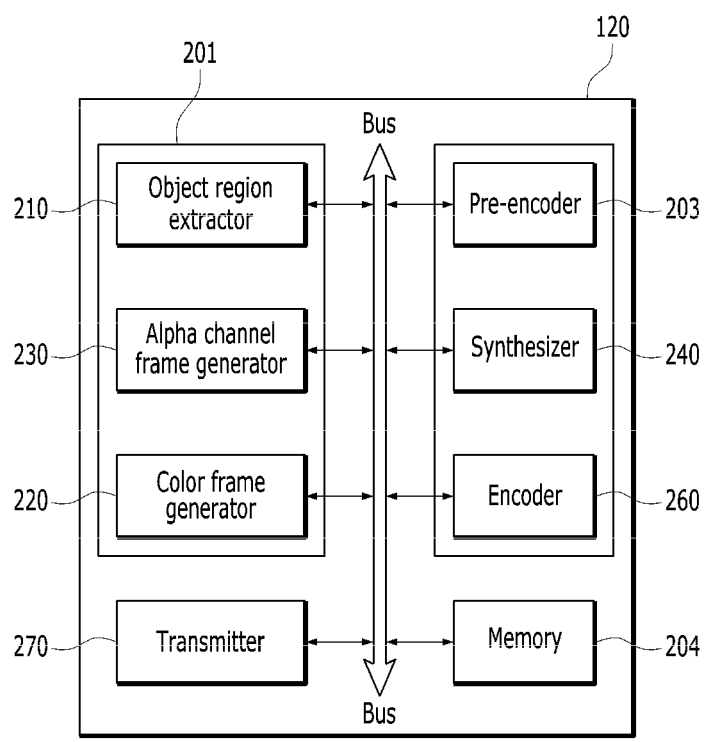
FIG. 2 illustrates a multimedia transmitting device in accordance with at least one embodiment.

FIG. 2 illustrates a multimedia transmitting device in accordance with at least one embodiment. Referring to FIG. 2, multimedia transmitting device 130 may be a device that receives moving images and processes the received moving images. That is, multimedia transmitting device 130 may be a computing system including at least one of memories, processors, and communication circuits.

In accordance with at least one embodiment, multimedia transmitting device may include central processor 201, image processor 203, and communication circuit 270. Communication circuit 270 may perform communication with other entities through network 400. Communication circuit 270 may receive data corresponding data related to target contents (e.g., moving image, still images, supplementary information thereof) from contents server 110. Communication circuit 270 may include at least one module (or at least one circuit) for communicating with other entities (e.g., multimedia reproducing device 130, contents service server 110, etc.) through a communication network (e.g., network 400). Herein, the communication network (e.g., network 400) may include a variety of communication networks such as a wireless communication network and a wired communication network. For example, the communication network may include a wideband code division multiple access (WCDMA) network, a microwave access (WiMAX) network, a wireless fidelity (Wi-Fi) network, a long term revolution (LTE) network, x digital subscriber line (xDSL) network, a hybrid fiber-coaxial (HFC) network, a satellite network, a global system for mobile communication (GSM) edge radio access network (GERAN), a universal terrestrial radio access network (UTRAN), an evolved universal terrestrial radio access network (E-UTRAN), a wireless local area network (W-LAN), a public switched telephone network (PSTN), an integrated services for digital network (ISDN), an international mobile telecommunications (IMT)-2000 network, a wired area network (WAN), a local area network (LAN), a metropolitan area network (MAN), a cable television (CATV), third generation partnership project core networks (3GPP-CNs), an European telecommunications standards institute telecommunication & internet converged service & protocols for advanced networks core network (ETSI TISPAN CN), a 3GPP2 CN, a machine to machine (M2M) network, a broadcast network, a radio frequency identification (RFID) network, a near field communication (NFC) network, a ultra-wideband (UWB) network, a Bluetooth communication network, but the present disclosure is not limited thereto. In at least one embodiments, communication circuit 1300 may include at least one of a wireless communication circuit and a wired communication circuit. Herein, the wireless communication circuit and wired communication may be separately or integrally configured.

Processors 201 and 203 may perform or control overall operation of device 120. For example, processors 201 and 203 may be a central processing circuitry that controls constituent elements (e.g., memory, communication circuit, etc.) of multimedia transmitting device 120 and/or performs a variety of operations (or functions) of multimedia transmitting device 120.

Memory 204 may store a variety of information. For example, memory 204 may store data necessary for performing the features of embodiments of the present disclosure. Memory 204 may further include any software programs and related data. Memory 204 may further store an operation system data, applications, and related data, received from other entities through a variety of communication media (e.g., communication networks). In accordance with at least one embodiment, memory 204 may include at least one of an internal memory and an external memory according to embodiments. For example, memory 1200 may be a flash memory, hard disk, multimedia card micro memory, SD or XD memory, Random Access Memory (RAM), Static Random-Access Memory (SRAM), Read-Only Memory (ROM), Programmable Read-Only Memory (PROM), Electrically Erasable Programmable Read-Only Memory (EEPROM), magnetic memory, magnetic disk, or optical disk, a SD card, a USB memory, but is not limited thereto.

Central processor 201 may include object region extractor 210, color frame generator 220, and alpha channel frame generator 230. Image processor 203 may include synthesizer 240, pre-encoder 250, and encoder 260. The terms "system," "processor," "controller," "component," "module," "interface,", "model," "unit" or the like are generally intended to refer to a computer-related entity, either hardware, a combination of hardware and software, software, or software in execution. For example, a component may be, but is not limited to being, a process running on a processor, a processor, a controller, a control processor, an object, an executable, a thread of execution, a program, and/or a computer. By way of illustration, both an application running on a controller or processor and the controller or processor can be a component. One or more components may reside within a process and/or thread of execution and a component may be localized on one computer and/or distributed between two or more computers.

Object region extractor 210 may extract regions including objects (e.g., object region) from original moving images. The object region may be a rectangular region including target objects. That is, object region extractor 210 may identify target objects from the original image and define an object region that include the identified target object and a predetermined peripheral region.

Color frame generator 220 may generate a color frame for the extracted object region. Color frame generator 220 may generate a color frame to be smaller than a half size of one frame of the original moving image. For example, the color frame may be a YUV frame.

Alpha channel frame generator 230 may generate an alpha channel frame according to the alpha channel included in the original moving image to be correspondence to the extracted object region. Alpha channel frame generator 230 may generate the alpha channel frame to be smaller than a half size of one frame of the original moving image.

Synthesizer 240 may generate a synthesized frame by synthesizing the color frame and the alpha channel frame. Synthesizer 240 may arrange the color frame and the alpha channel frame in parallel and not to be overlapped to each other. The synthesized frame may include a YUV frame as the color frame and an AYUV frame as an Alpha Channel Frame.

Synthesizer 240 may generate the synthesized frame to be smaller than one frame of the original moving image. That is, a size of the synthesized frame is smaller than that of one frame of the original moving image. Since the synthesized frame to be smaller that an original frame, it is possible to reduce or eliminate the data transmission traffic problem that might be caused by a Webm scheme.

Pre-encoder 250 may change colors of a predetermined region in a color frame to a predetermined single color. For example, the predetermined region may be a surrounding region that surround the object region in the color frame or remaining regions in the color frame except the object region in the color frame. Herein, pre-encoder 250 may performing the process of filling the predetermined region (e.g., surrounding region or remaining region) with a predetermined single color, before performing encoding the synthesized frame. Accordingly, the efficiency of encoding may be improved when encoder 260 performs encoding on the synthesized frame because colors of the predetermined region in the color frame are changed to one single color.

Encoder 260 may encode the generated synthesized frame. For example, encoder 260 may encode the synthesized frame using H.264 CODEC.

Transmitter 270 may transmit the encoded synthesized frame to multimedia reproducing device 130. Furthermore, transmitter 270 may transmit a background image associated with the synthesized frame to multimedia reproducing device 130. The synthesized frame may be rendered by multimedia reproducing device 130 to be overlapped on the background image.

Transmitter 270 may transmit rendering information to multimedia reproducing device 130. The rendering information is information for rendering the synthesized frame on the background image. In particular, the rendering information may include information on a coordinate of an object region, which indicates a position of the object region to be rendered on the background image. Furthermore, the rendering information may include information on a time of rendering the object region on the background image.

Figure 3B:
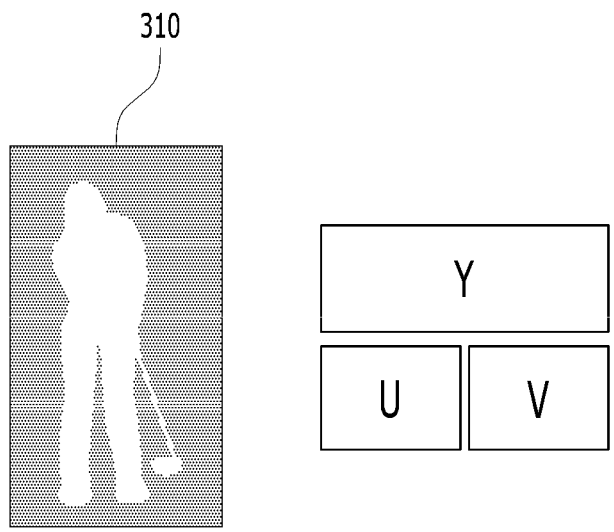
Figure 3C:
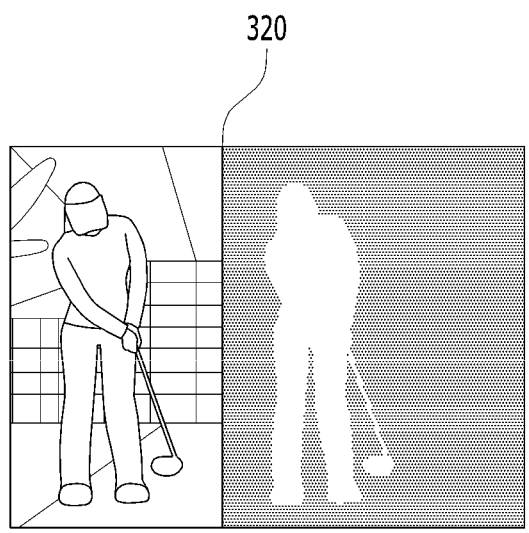

FIG. 3A to FIG. 3C are diagrams for synthesizing moving images including an alpha channel by a multimedia transmitting device in accordance with at least one embodiment.

FIG. 3A illustrate a process of generating a color frame in accordance with at least one embodiment. Referring to FIG. 3A, multimedia transmitting device 120 may extract an object region 300 from an original moving image. For example, multimedia transmitting device 120 extracts an object region 300 including a golf player as a target object from the original moving image.

Multimedia transmitting device 120 may generate a color frame 300 for the extracted object region. For example, multimedia transmitting device 120 may generate a YUV color frame for the object region 300 including the golf player as the target object. Herein, multimedia transmitting device 120 may control a size of the color frame to be smaller than half of one frame of the original moving image.

FIG. 3B illustrate a process of generating an alpha channel frame in accordance with at least one embodiment. Referring to FIG. 3B, multimedia transmitting device 120 may generate an alpha channel frame 310 extracted from an alpha channel included in the original moving image to be correspondence to the object region. For example, multimedia transmitting device 120 may generate alpha channel frame 310 i) to be transparent, ii) to have a region of a golf player to be white, and iii) the remaining region surrounding the golf player to be black. Herein, multimedia transmitting device 120 may control a size of the alpha channel frame 310 to be smaller than about half of one frame of the original moving image.

FIG. 3C illustrates a process of generating a synthesized frame in accordance with at least one embodiment. Referring to FIG. 3A to FIG. 3C, multimedia transmitting device 120 may generate a synthesized frame 320 by synthesizing the color frame 300 and the alpha channel frame 310. For example, multimedia transmitting device 120 may generate the synthesized frame 320 having a half frame as the color frame 300 and the other half frame as the alpha channel frame 310. Accordingly, the one frame of the synthesized frame 320 has about the same size of the one frame of the original frame.

Figure 4A:
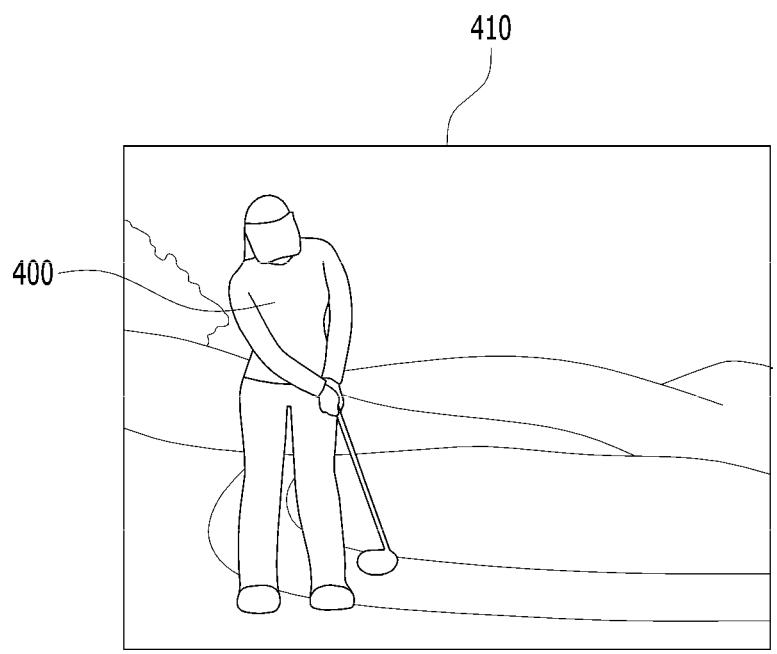
FIG. 4A to FIG. 4C are diagrams for explaining pre-encoding moving images having an alpha channel in a multimedia transmitting device.
Figure 4B:
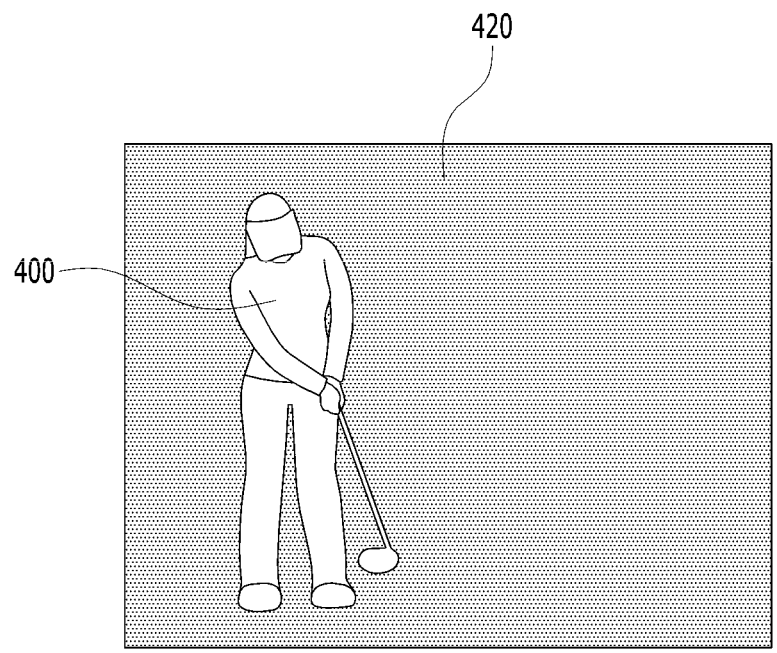
Figure 4C:
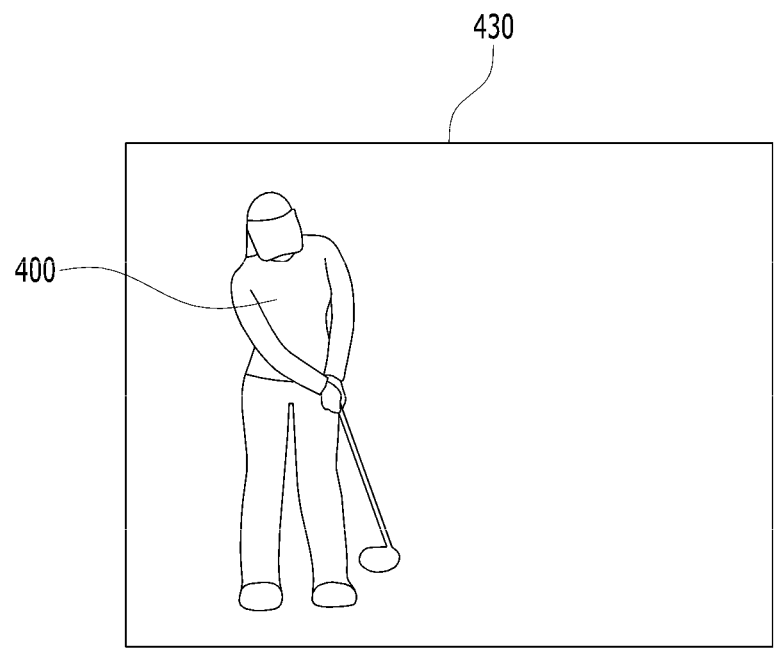

FIG. 4A to FIG. 4C are diagrams for describing an encoding process of a moving image having an alpha channel by a multimedia transmitting device in accordance with at least t one embodiment. FIG. 4A illustrates an original moving image in accordance with at least one embodiment. Referring to FIG. 4A, the original moving image may include an object region 400 and a surrounding region 410. For example, the original contents (e.g., original moving image) may include the object region 400 including a golf player and the surrounding image 410 including some golf field and surroundings.

FIG. 4B illustrates a pre-encoding process in accordance with at least one embodiment. Referring to FIG. 4B, multimedia transmitting device 120 may process surrounding region 420 surrounding object region 410 to have a predetermined single color before performing encoding of the synthesized frame. For example, when pixel values of the surrounding region are '0x00983423' and '0x00438533', multimedia transmitting device 120 may change the pixel values to '0x00000000'.

FIG. 4C illustrates an encoding process in accordance with at least one embodiment. Referring to FIG. 4C, multimedia transmitting device 120 generates a synthesized frame by synthesizing the pre-encoded color frame 430 having the object region 400 and the alpha channel frame and encode the generated synthesized frame using H.264 CODEC.

FIG. 5 illustrates rendering information in accordance with at least one embodiment. Referring to FIG. 5, rendering information 500 may include various types of information for rendering a color frame and an alpha channel frame on a background image at multimedia reproducing device 130. In particular, the rendering information may include information on a coordinate of an object region, which indicates a position of the object region to be rendered on the background image. Furthermore, the rendering information may include information on a time of rendering the object region on the background image.

For example, rendering information 500 may include properties of time 510, visible 520, start_x 530, start_y 540, width 550, and height 560.

time 510 may denote a time for displaying a synthesized frame on a background image. That is, time 510 may be a time of rendering the object region on a background image. For example, time 510 may be set with '0.333'.

visible 520 may indicate whether a synthesized frame is activated on a predetermined time in time 510. visible 520 may be set with one of 'true' and 'false'.

start_x 530 may denote an x coordinate indicating a start point of the object region. For example, start_x 530 may be set with '200'.

start_y 540 may denote any coordinate indicating a start point of the object region. For example, start_y 540 may be set with '300'.

width 550 may be a width for displaying the object region. For example, width 550 may be set with '270'.

height 560 may be a height for displaying the object region. For example, height 560 may be set with '360'.

Based on the set values of width 550 and height 560, a size of an object region to be displayed on a display may be determined.

Furthermore, constants and variables in FIG. 5 may have following meanings.

version: 1 (constant), time: milliseconds from a beginning of contents (milliseconds), start_x: absolute coordinate x, start_y: absolute coordinate y, width: width, height: height, and visible: HVR activated or not (true, false)

Figure 6:
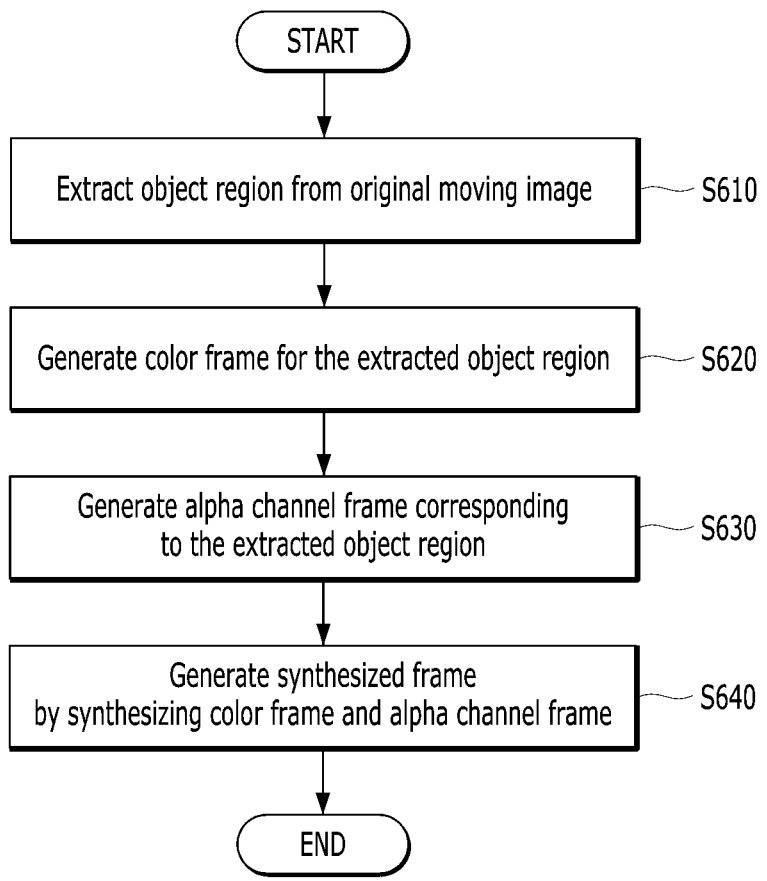
FIG. 6 is a flowchart showing a method for processing moving images including alpha channel in a multimedia transmitting device.

FIG. 6 is a flowchart illustrating a method for processing moving image including an alpha channel in accordance with at least one embodiment. Referring to FIG. 6, multimedia transmitting device 120 may perform operations described with reference to FIG. 1 to FIG. 5.

At step S610, multimedia transmitting device 120 may extract an object region from an original moving image. That is, the original moving image may be a set of image frames consecutively connected and each including image data. Each frame may be formed of pixel data. Multimedia transmitting device 120 may identify a target object from the original moving image, an object region having the target object, and a surrounding region that surrounds the object region of the target object.

At step S620, multimedia transmitting device 120 may generate a color frame including the extracted object region.

At step S630, multimedia transmitting device 120 may generate an alpha channel frame from the alpha channel included in the original moving image to be correspondence to the extracted object region.

At step S640, multimedia transmitting device 120 may generate a synthesized frame by synthesizing the color frame and the alpha channel frame.

The operations in the steps S610 to S640 may further include additional operations steps or divided into sub-operation steps. In addition, some of operations may be omitted and performed without order shown in FIG. 6.

Figure 7:
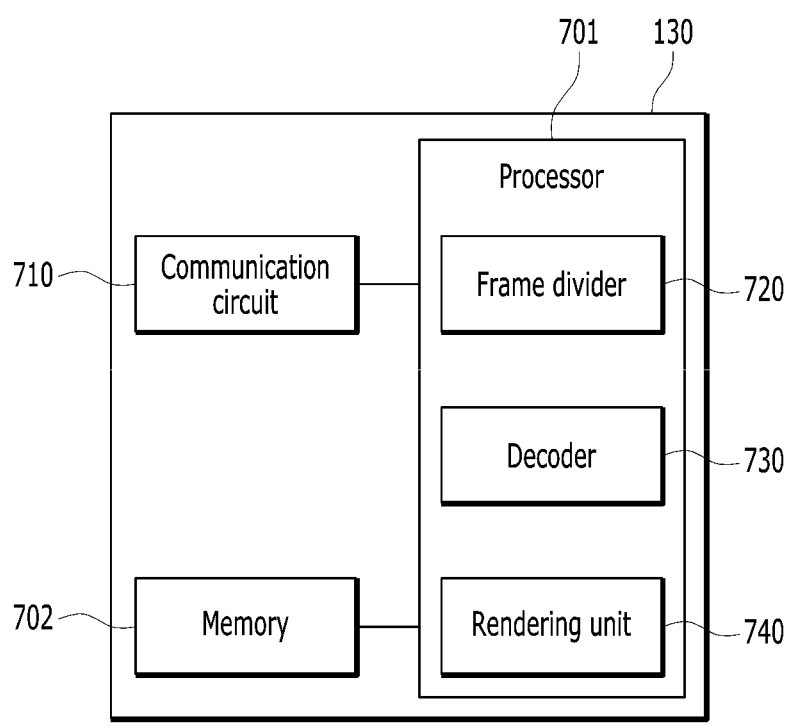
FIG. 7 is a diagram illustrating a multimedia reproducing device.

FIG. 7 illustrates a multimedia reproducing device in accordance with at least one embodiment. Referring to FIG. 7, multimedia reproducing device 130 may have a structure similar to a computing system. For example, multimedia reproducing device 130 may include processor 301, communication circuit 710, and memory 702.

Communication circuit 710 may perform communication with other entities through network 400. Communication circuit 710 may receive multimedia data including target contents (e.g., moving image, still images, supplementary information thereof) from contents service server 110 or multimedia transmitting device 120. Communication circuit 710 may include at least one module (or at least one circuit) for communicating with other entities (e.g., multimedia transmitting device 120, contents service server 110, etc.) through a communication network (e.g., network 400). Herein, the communication network (e.g., network 400) may include a variety of communication networks such as a wireless communication network and a wired communication network. For example, the communication network may include a wideband code division multiple access (WCDMA) network, a microwave access (WiMAX) network, a wireless fidelity (Wi-Fi) network, a long term revolution (LTE) network, x digital subscriber line (xDSL) network, a hybrid fiber-coaxial (HFC) network, a satellite network, a global system for mobile communication (GSM) edge radio access network (GERAN), a universal terrestrial radio access network (UTRAN), an evolved universal terrestrial radio access network (E-UTRAN), a wireless local area network (W-LAN), a public switched telephone network (PSTN), an integrated services for digital network (ISDN), an international mobile telecommunications (IMT)-2000 network, a wired area network (WAN), a local area network (LAN), a metropolitan area network (MAN), a cable television (CATV), third generation partnership project core networks (3GPP-CNs), an European telecommunications standards institute telecommunication & internet converged service & protocols for advanced networks core network (ETSI TISPAN CN), a 3GPP2 CN, a machine to machine (M2M) network, a broadcast network, a radio frequency identification (RFID) network, a near field communication (NFC) network, a ultra-wideband (UWB) network, a Bluetooth communication network, but the present disclosure is not limited thereto. In at least one embodiments, communication circuit 1300 may include at least one of a wireless communication circuit and a wired communication circuit. Herein, the wireless communication circuit and wired communication may be separately or integrally configured.

Processor 701 may perform or control overall operation of multimedia reproducing device 130. For example, processor 701 may be a central processing circuitry that controls constituent elements (e.g., memory, communication circuit, etc.) of device 130 and/or performs a variety of operations (or functions) of device 130.

Memory 702 may store a variety of information. For example, memory 702 may store data necessary for performing the features of embodiments of the present disclosure. Memory 702 may further include any software programs and related data. Memory 702 may further store an operation system data, applications, and related data, received from other entities through a variety of communication media (e.g., communication networks). In accordance with at least one embodiment, memory 204 may include at least one of an internal memory and an external memory according to embodiments. For example, memory 1200 may be a flash memory, hard disk, multimedia card micro memory, SD or XD memory, Random Access Memory (RAM), Static Random Access Memory (SRAM), Read-Only Memory (ROM), Programmable Read-Only Memory (PROM), Electrically Erasable Programmable Read-Only Memory (EEPROM), magnetic memory, magnetic disk, or optical disk, a SD card, a USB memory, but is not limited thereto.

In accordance with at least one embodiment, processor 701 may include decoder 730, frame divider 720, and rendering unit 740. Multimedia reproducing device 130 may operate in an environment where alpha channel is not supported. For example, multimedia reproducing device 130 may be a device not supporting VP8 and VP9 CODEC and supporting H.264 CODEC.

Communication circuit 710 may receive a synthesized frame from multimedia transmitting device 120. The synthesized frame may be a frame synthesized with a color frame and an alpha channel frame. For example, the synthesized frame may be an 'AYUV' frame.

Communication circuit 710 may receive a background image for the synthesized frame from multimedia transmitting device 120. The background image may be a broadcasting image where the object region is displayed on.

Communication circuit 710 may receive rendering information from multimedia transmitting device 120. The rendering information may be information for rendering the color frame and the alpha channel frame on the background image. The rendering information may include information on a coordinate of the object region and a time of the object region. The information on a coordinate of an object region may indicate a position of the object region to be rendered on the background image. Furthermore, the information on a time of the object region may indicate a time of rendering the object region on the background image.

Decoder 730 may decode the synthesized frame. For example, decoder 730 may use H.264 CODEC to decode the synthesized frame.

Frame divider 720 may divide the decoded synthesized frame into a color frame and an alpha channel frame. The color frame and the alpha channel frame may be generated for the object region extracted from the original moving image by multimedia transmitting device 120. For example, frame divider 720 may divide the decoded 'AYUV frame' into an 'YUV frame' (e.g., color frame) and an 'Alpha Channel frame'.

Rendering unit 740 may render the color frame and the alpha channel frame on the background image. Herein, rendering unit 740 may render the color frame and the alpha channel frame to be overlapped on the background image.

Rendering unit 740 may use the rendering information to render the color frame and the alpha channel frame on the background image. For example, based on coordinate information and time information, the color frame and the alpha channel frame may be rendered on the background image.

FIG. 8A to FIG. 8D are diagrams for describing a method for reproducing a moving image including an alpha channel by a multimedia reproducing device in accordance with at least one embodiment.

Figure 8A:
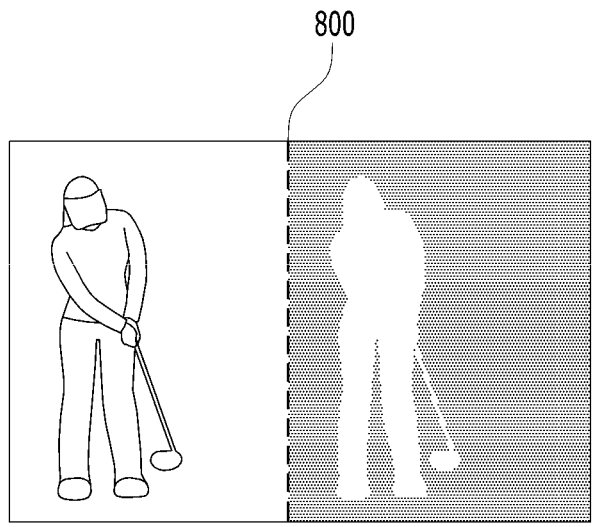
FIG. 8A to FIG. 8D are diagrams for explaining reproducing moving image including an alpha channel in a multimedia reproducing device in accordance with at least one embodiment.

FIG. 8A illustrates a synthesized frame received at multimedia reproducing device in accordance with at least one embodiment. Referring to FIG. 8A, multimedia reproducing device 130 may receive a synthesized frame 800 from multimedia transmitting device 120. The synthesized frame may be a frame generated by synthesizing a color frame and an alpha channel frame.

Figure 8B:
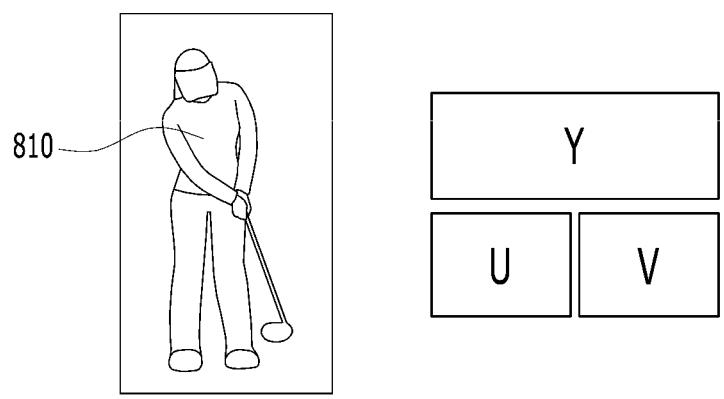

FIG. 8B illustrates a color frame separated from a synthesized frame in accordance with at least one embodiment. Referring to FIG. 8A and FIG. 8B, multimedia reproducing device 130 may divide the synthesized frame 800 into the color frame 810. The color frame 810 may be a 'YUV frame'.

Figure 8C:
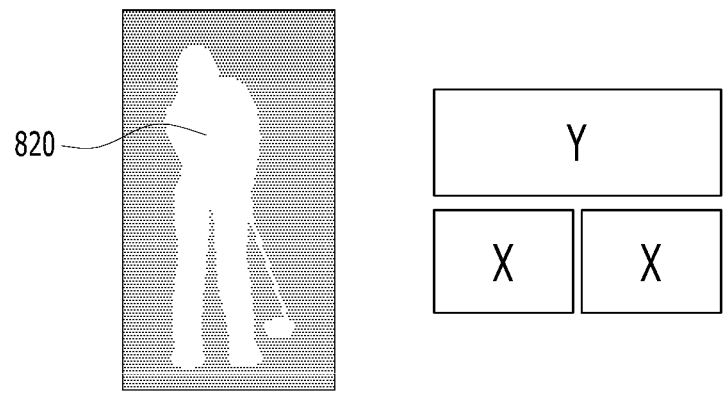

FIG. 8C illustrates an alpha channel separated from a synthesized frame in accordance with at least one embodiment. Referring to FIG. 8A and FIG. 8C, multimedia reproducing device 130 may separate the alpha channel frame 820 from the synthesized frame 800.

Figure 8D:
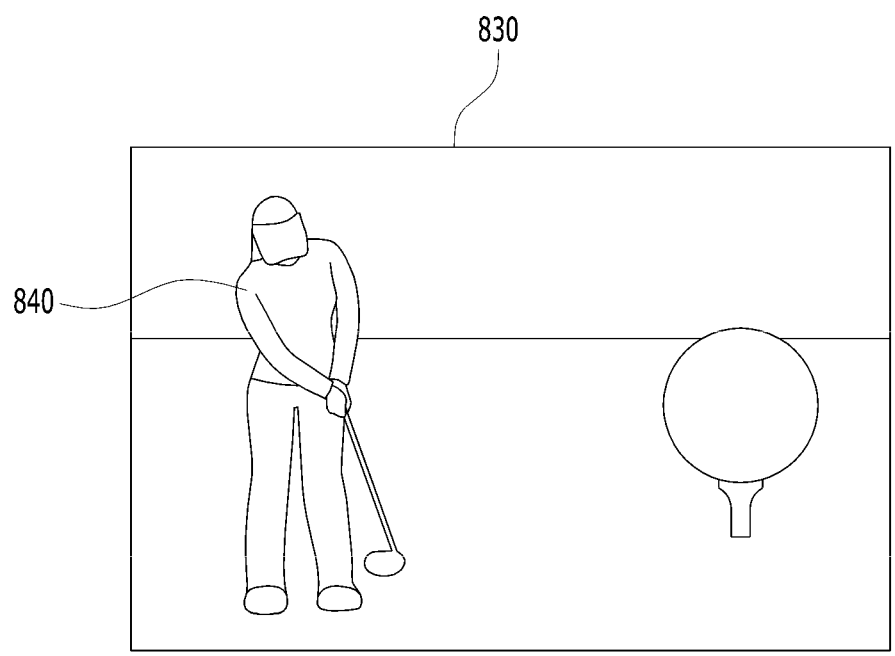

FIG. 8D illustrate an exemplary image generated by rendering a color frame and an alpha channel frame on a background image in accordance with at least one embodiment. Referring to FIG. 8D, multimedia reproducing device 130 may render the color frame and the alpha channel frame on the background image 830. For example, multimedia reproducing device 130 may synthesize and convert the color frame ('YUV frame') and the alpha channel frame to an 'ARGB frame' in order to display the rendering result through a display device in color. Multimedia reproducing device 130 may render an object 840 on a background image 830 through the 'ARGB frame'.

Figure 9:
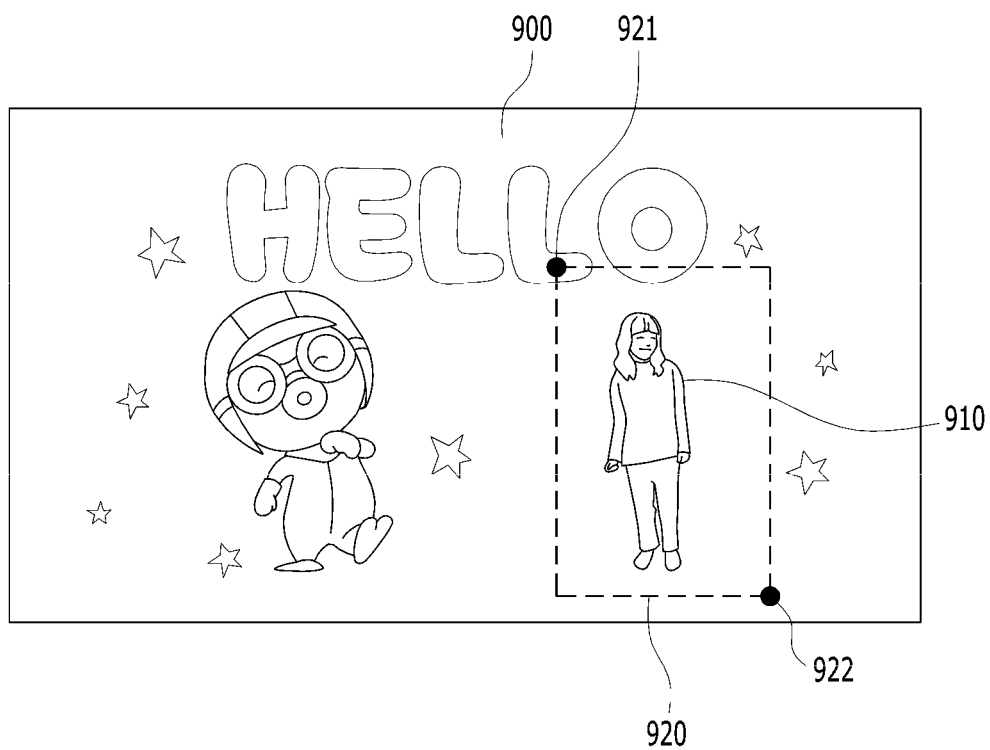
FIG. 9 is a diagram for showing an example of rendering a color frame and an alpha channel on a background image by a multimedia reproducing device in accordance with at least one embodiment.

FIG. 9 illustrates another exemplary image generated by rendering a color frame and an alpha channel frame on a background image in accordance with at least one embodiment. Referring to FIG. 9, multimedia reproducing device 130 may render the color frame and the alpha frame on the background image 900 based on the rendering information. For example, the rendering information may include a time of rendering object region 920 and a coordinate of object region 920 for rendering the object region on a background image. In particular, object region 920 may be a rectangular region including a target object 910. For example, multimedia reproducing device 130 may display object region 920 on background image 900 at the time of rendering based on the coordinate including start point 921 (start_x, start_y) and end point 922 (end_x, end_y), included in the rendering information.

Figure 10:
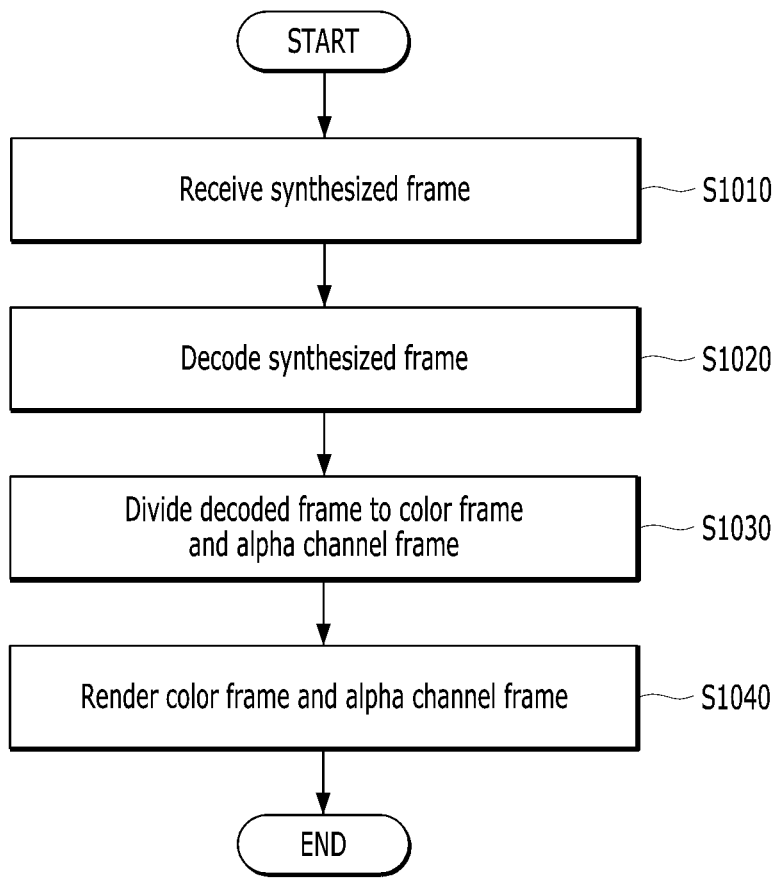
FIG. 10 is a flowchart illustrating a method for reproducing a moving image having an alpha channel by a multimedia reproducing device in accordance with at least one embodiment.

FIG. 10 illustrates a method of reproducing a moving image including an alpha channel by a multimedia reproducing device in accordance with at least one embodiment. Referring to FIG. 10, multimedia reproducing device 130 may perform operations described with reference to FIG. 1 to FIG. 9.

At step S1010, multimedia reproducing device 130 may receive a synthesized frame from multimedia transmitting device 120.

At step S1020, multimedia reproducing device 130 may decode the synthesized frame.

At step S1030, multimedia reproducing device 130 may separate a color frame and an alpha channel frame from the decoded synthesized frame.

At step S1040, multimedia reproducing device 130 may render the color frame and the alpha channel frame on the background image.

The operations in the steps S1010 to S1040 may further divided into sub operations and include additional operations. Furthermore, some operations may be omitted.

Reference herein to "one embodiment" or "an embodiment" means that a particular feature, structure, or characteristic described in connection with the embodiment can be included in at least one embodiment of the invention. The appearances of the phrase "in one embodiment" in various places in the specification are not necessarily all referring to the same embodiment, nor are separate or alternative embodiments necessarily mutually exclusive of other embodiments. The same applies to the term "implementation."

As used in this application, the word "exemplary" is used herein to mean serving as an example, instance, or illustration. Any aspect or design described herein as "exemplary" is not necessarily to be construed as preferred or advantageous over other aspects or designs. Rather, use of the word exemplary is intended to present concepts in a concrete fashion.

Additionally, the term "or" is intended to mean an inclusive "or" rather than an exclusive "or". That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. In addition, the articles "a" and "an" as used in this application and the appended claims should generally be construed to mean "one or more" unless specified otherwise or clear from context to be directed to a singular form.

Moreover, the terms "system," "component," "module," "interface,", "model" or the like are generally intended to refer to a computer-related entity, either hardware, a combination of hardware and software, software, or software in execution. For example, a component may be, but is not limited to being, a process running on a processor, a processor, an object, an executable, a thread of execution, a program, and/or a computer. By way of illustration, both an application running on a controller and the controller can be a component. One or more components may reside within a process and/or thread of execution and a component may be localized on one computer and/or distributed between two or more computers.

The embodiments of the present disclosure can be embodied in the form of methods and apparatuses for practicing those methods. The embodiments of the present disclosure can also be embodied in the form of program code embodied in tangible media, non-transitory media, such as magnetic recording media, optical recording media, solid state memory, floppy diskettes, CD-ROMs, hard drives, or any other machine-readable storage medium, wherein, when the program code is loaded into and executed by a machine, such as a computer, the machine becomes an apparatus for practicing the invention. The present invention can also be embodied in the form of program code, for example, whether stored in a storage medium, loaded into and/or executed by a machine, or transmitted over some transmission medium or carrier, such as over electrical wiring or cabling, through fiber optics, or via electromagnetic radiation, wherein, when the program code is loaded into and executed by a machine, such as a computer, the machine becomes an apparatus for practicing the invention. When implemented on a general-purpose processor, the program code segments combine with the processor to provide a unique device that operates analogously to specific logic circuits. The present invention can also be embodied in the form of a bitstream or other sequence of signal values electrically or optically transmitted through a medium, stored magnetic-field variations in a magnetic recording medium, etc., generated using a method and/or an apparatus of the present invention.

It should be understood that the steps of the exemplary methods set forth herein are not necessarily required to be performed in the order described, and the order of the steps of such methods should be understood to be merely exemplary. Likewise, additional steps may be included in such methods, and certain steps may be omitted or combined, in methods consistent with various embodiments of the present invention.

As used herein in reference to an element and a standard, the term "compatible" means that the element communicates with other elements in a manner wholly or partially specified by the standard and would be recognized by other elements as sufficiently capable of communicating with the other elements in the manner specified by the standard. The compatible element does not need to operate internally in a manner specified by the standard.

No claim element herein is to be construed under the provisions of 35 U.S.C. § 112, sixth paragraph, unless the element is expressly recited using the phrase "means for" or "step for."

Although embodiments of the present invention have been described herein, it should be understood that the foregoing embodiments and advantages are merely examples and are not to be construed as limiting the present invention or the scope of the claims. Numerous other modifications and embodiments can be devised by those skilled in the art that will fall within the spirit and scope of the principles of this disclosure, and the present teaching can also be readily applied to other types of apparatuses. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. An apparatus for transmitting a moving image including an alpha channel, the apparatus comprising:
    an object region extractor configured to extract an object region from the moving image;
    a color frame generator configured to generate a color frame corresponding to the extracted object region;
    an alpha channel frame generator configured to generate an alpha channel frame corresponding to the extracted object region based on the alpha channel included in the moving image, wherein the alpha channel frame is a black and white frame;
    a synthesizer configured to generate a synthesized frame by synthesizing the color frame and the alpha channel frame, and wherein the color frame and the alpha channel frame arranged in parallel and not overlapped with each other;
    an encoder configured to encode the synthesized frame; and
    a transmitter configured to transmit the encoded synthesized frame to a reproducing device.

2. The apparatus of claim 1, wherein the object region is a rectangular region including at least one of target objects.

3. The apparatus of claim 1, wherein:
    the color frame generator is configured to generate the color frame to be smaller than about half of a one frame of the moving image; and
    the alpha channel frame generator is configured to generate the alpha channel frame to be smaller than about half of a one frame of the moving image.

4. The apparatus of claim 3, wherein the synthesizer is configured to generate the synthesized frame to be smaller than one frame of the moving image.

5. The apparatus of claim 1, wherein the transmitter is configured to further transmit a background image associated with the synthesized frame to the reproducing device, and the synthesized frame is rendered to be overlapped on the background image.

6. The apparatus of claim 5, wherein the transmitter is configured to further transmit rendering information to the reproducing device for rendering the synthesized frame on the background image.

7. The apparatus of claim 6, wherein the rendering information include information on coordinates of the object region which indicates a position to be rendered on the background image for rendering the color frame and the alpha channel frame.

8. The apparatus of claim 7, wherein the rendering information includes information on a time of rendering the synthesized frame on the background image.

9. The apparatus of claim 1, wherein the apparatus operates in an environment not supporting the alpha channel.

10. The apparatus of claim 1, further comprising:
    a pre-encoder configured to change colors of a surrounding region in the color frame to a predetermined single color, wherein the surrounding region is a region surrounding the object region in the color frame.

11. The apparatus of claim 10, wherein the pre-encoder is configured to perform the changing color process before performing encoding the synthesized frame.

12. An apparatus for reproducing a moving image including an alpha channel, the apparatus comprising;
    a receiver configured to receive a synthesized frame from a transmitting apparatus, wherein the received synthesized frame includes a color frame and an alpha channel frame arranged in parallel and not overlapped with each other;
    a decoder configured to decode the synthesized frame;
    a frame divider configured to divide the decoded synthesized frame into the color frame and the alpha channel frame, wherein the alpha channel frame is a black and white frame; and
    a rendering unit configured to render the color frame and the alpha channel frame,
    wherein the color frame and the alpha channel frame are generated corresponding to an object region extracted from the moving image.

13. The apparatus of claim 12, wherein:
    the receiver is configured to receive a background image associated with the synthesized image from the transmitting apparatus; and
    the rendering device is configured to render the color frame and the alpha channel frame to be overlapped on the background image.

14. The apparatus of claim 13, wherein the receiver is configured to receive rendering information, from the transmitting apparatus, for rendering the color frame and the alpha channel frame on the background image.

15. The apparatus of claim 14, wherein the rendering information includes coordinates of the object region to be rendered on the background image, and the rendering unit is configured to render the color frame and the alpha channel frame on the background image using the coordinates.

16. The apparatus of claim 15, wherein the rendering information includes a time of rendering and the rendering unit is configured to perform the rendering based on the time.

17. The apparatus of claim 12, wherein colors of a surrounding region in the color frame is changed to a predetermined single color before performing encoding.

18. A method of processing a moving image including an alpha channel, the method comprising:
- extracting an object region from the moving image;
- generating a color frame corresponding to the extracted object region;
- generating an alpha channel frame corresponding to the extracted object region based on the alpha channel included in the moving image, wherein the alpha channel frame is a black and white frame; and
- generating a synthesized frame by synthesizing the color frame and the alpha channel frame, wherein the synthesized frame includes the color frame and the alpha channel frame arranged in parallel and not to be overlapped to each other.

* * * * *